UNITED STATES PATENT OFFICE.

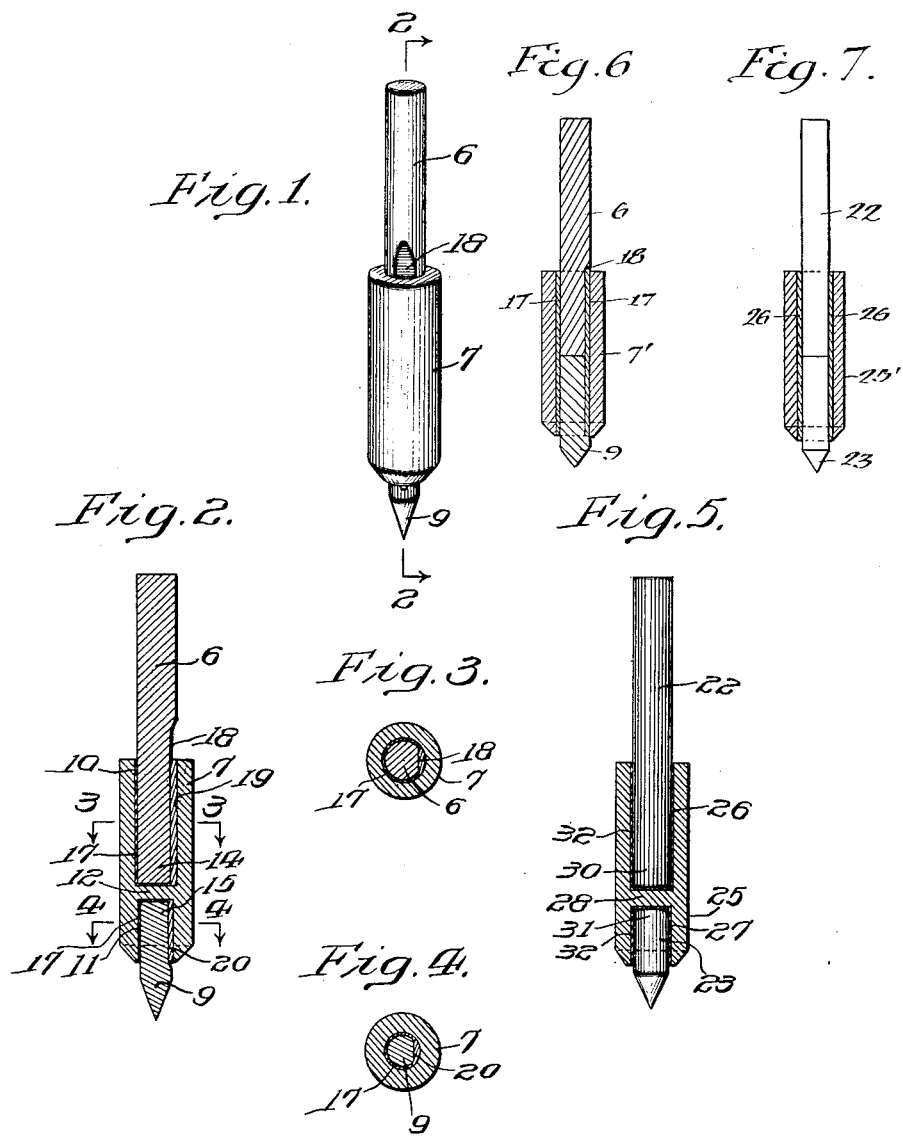

JAMES W. OWEN, OF LANSDOWNE, PENNSYLVANIA, AND ALBERTIS HEWITT, OF CAMDEN, NEW JERSEY, ASSIGNORS TO VICTOR TALKING MACHINE COMPANY, A CORPORATION OF NEW JERSEY.

STYLUS.

1,235,154.   Specification of Letters Patent.   Patented July 31, 1917.

Application filed July 22, 1912. Serial No. 710,741.

*To all whom it may concern:*

Be it known that we, JAMES W. OWEN, a citizen of the United States, and a resident of Lansdowne, in the county of Delaware, State of Pennsylvania, and ALBERTIS HEWITT, a citizen of the United States, and a resident of Camden, in the county of Camden, State of New Jersey, have invented certain new and useful Improvements in Styli, of which the following is a specification, reference being had to the accompanying drawing.

This invention particularly relates to styli which may be operatively connected to vibrate the diaphragm of a sound reproducing device, when coöperatively engaged with a sound record, to effect the reproduction of recorded sound waves, or to styli adapted to be employed in connection with a recording device, and is especially directed to that class of styli which are provided with separate stylus points formed of wear-resisting material suitable to withstand the wear incident to their coöperation with a sound record tablet.

We are aware that means have been proposed for the purpose of absorbing such vibrations as tend to effect the production of undesirable or extraneous sound, due principally to the contact of the stylus point with the surface of the sound record tablet, and that styli having the shank formed of fibrous material and provided with a point formed of a relatively hard substance, capable of resisting wear, have been employed for this purpose. It is believed, however, that no attempt has heretofore been made to effect such refinement by providing a stylus with a shank of hard material, such as steel, and a point of a relatively harder wear-resisting material, such as a jewel, joined in integral relation by a coupling of relatively pliant resilient material.

The principal objects of this invention, broadly defined, are to provide a stylus that will combine the advantages of the steel stylus with the advantages incident to a stylus having a shank formed wholly of such material as will tend to reduce or subdue vibrations which produce undesirable or extraneous sound; to provide a sound reproducing stylus, having a shank comprising regions of different rigidity respectively formed of materials of relative resiliency, with a stylus point member formed of a substance of such hardness and wear-resisting qualities as will substantially withstand any tendency to change its form incident to its coöperation with the undulatory surfaces of the grooves of a sound record; to provide a stylus that may be continuously employed without injury to the sound record with which it coöperates; and to provide a stylus that will tend to refine the reproduction of the recorded sound waves and enhance the quality of the reproduction, by eliminating certain extraneous sounds, without very materially affecting the volume.

Other objects of this invention, are to provide a stylus, having a separate shank and point member, with a separately formed coupling of resilient material, joining said shank and point member together, and having means to determine the volume of tone produced by said stylus thus formed; and to provide said shank and point member with a flattened side or a groove forming a recess for permitting the escape of cement from the sockets in said coupling when said shank and point member are forced therein.

Another object of this invention, specifically stated, is to provide a stylus with a coupling formed of bakelite embracing the opposed ends of said shank and point member, and including an adhesive bakelite cement operative to coalesce said parts together and to form an integral composite structure having distinct regions of relative hardness and resiliency.

Further objects of this invention are, to provide a stylus having a separate shank and point, with a separately formed coupling of resilient material whose natural shrinkage may be utilized to integrally connect said shank and point, and form a stylus structure having relatively resilient regions; and to provide said coupling with an intervening web forming a cushion interposed between the opposed ends of said shank and point.

This invention also comprehends the method of producing styli which consists in forming a socketed coupling of bakelite or equivalent material, inserting a shank member and a point member in the respective sockets provided therefor in said coupling with a suitable adhesive cement, and backing the stylus structure thus formed, to coalesce said parts into a composite integral body.

This invention further includes the method of producing styli which consists in forming a socketed coupling of soluble material, such as celluloid, coating the surfaces of a shank member and point member with a suitable solvent, and inserting said shank member and point member in the respective sockets provided therefor in said coupling.

Briefly stated, the preferred embodiment of this invention, hereinafter described, comprises a stylus having a shank preferably formed of steel, and a separate reproducing point member formed of a jewel or other suitable hard substance, such as tantalum, iridium, etc., connected with said shank by a separate collar, preferably formed of bakelite, celluloid, or other suitable resilient material, having suitable sockets for the reception of the opposed ends of said shank and point member, which may be rigidly secured therein by a suitable cement or solvent, and which are preferably provided with a flattened side forming a recess or groove for the convenient escape of the cementing agent.

This invention further embodies all of the various novel features of construction and arrangement hereinafter more definitely specified.

In the accompanying drawing, Figure 1 is a perspective view of a stylus showing the preferred embodiment of this invention; Fig. 2 is a central longitudinal sectional view of the stylus shown in Fig. 1, taken on the line 2—2 in said figure; Fig. 3 is a transverse sectional view, taken on the line 3—3 in Fig. 2; Fig. 4 is a transverse sectional view, similar to Fig. 3, taken on the line 4—4 in Fig. 2; Fig. 5 is a longitudinal sectional elevation of a modification of the invention shown in Figs. 1 to 4, inclusive, and Figs. 6 and 7 are views similar to Figs. 2 and 5 of modified forms of the invention of this application.

Referring to Figs. 1 to 4 of the drawing, the shank 6, which is preferably formed of steel, is conveniently connected, by the interposed coupling 7, with the point member 9, formed of a jewel or other suitable wear-resisting substance, such as tantalum, iridium, etc. Said coupling 7 is preferably formed of bakelite or other equivalent material, and is provided with sockets 10 and 11, respectively arranged to receive the shank 6 and jewel point member 9 snugly fitted therein, and with the web 12 interposed between the opposed ends 14 and 15 of the shank 6 and jewel point member 9, respectively, the distance between said opposed ends being conveniently regulated by varying the thickness of the web 12, whereby the tone of the stylus when assembled may be predetermined, it being obvious that a reduction of the thickness of the web 12 will increase the rigidity of the stylus and cause the stylus to produce a relatively loud tone, while any increase in the thickness of said web will similarly decrease the rigidity of said stylus and cause it to produce a softer tone.

As best shown in Fig. 2 of the drawing, the shank 6 and jewel joint member 9 are preferably retained in their respective sockets 10 and 11 by a suitable adhesive cement 17, preferably composed of bakelite, which may coalesce said coupling 7, shank 6, and jewel point member 9 together, to form an integral composite stylus, by baking the assembled structure in a temperature preferably about 250 degrees F.

Although the spaces between the shank 6 and surface of the socket 10, and between the jewel point member 9 and the surface of the socket 11 are shown in Fig. 2 greatly exaggerated, for convenience of illustration, it is to be understood that said shank 6 and jewel point member 9 preferably fit their respective sockets snugly, the diameters of said sockets being preferably about .001 of an inch greater than the diameters of the respective members to be fitted therein.

As best shown in Fig. 2 of the drawing, the shank 6 has one side cut away longitudinally to form a groove or recess 18, which coöperates with the surface of the socket 10 to provide a channel 19, when said shank is forced into said socket, for the convenient escape of the surplus cement therefrom. Likewise, the jewel point member 9 is similarly provided with a cut away portion forming a groove or recess 20, for the escape of surplus cement from the socket 11 when said member is forced therein.

In the form of this invention shown in Fig. 5, the stylus may be provided with a shank 22, formed of steel or other suitable material, which may be connected with a point member 23, formed of a jewel or other suitable wear-resisting substance, such as tantalum, iridium, etc., by a coupling 25, preferably formed of celluloid or equivalent material, having the socket 26 arranged to receive the shank 22, and the socket 27 arranged to receive the point member 23, and having a web 28 interposed between the opposed ends 30 and 31 of the shank 22 and jewel member 23, respectively.

It may be here noted that the properties of celluloid are such, that when its surface is coated with a suitable solvent, such as amyl-acetate, said surface and the adjacent underlying portion tend to swell, or, in other words, appear to be released from compression.

In this form of the invention, the peculiar properties of the celluloid above noted may be advantageously utilized by employing an adhesive cement 32, formed of celluloid dissolved in a suitable solvent, such as amyl-acetate, for holding the shank 22 and the jewel point member 23 in their respective sockets 26 and 27, it being noted that in addition to said shank and jewel point member being held by said cement, they are also held by the expansion of the surfaces of the sockets, which will effect a pressure upon said shank and point member and grip them with such tenacity as to prevent their accidental displacement, and consequently form a permanent composite integral stylus structure.

Although in each of the forms of this invention shown in the drawing the coupling is provided with a web between the opposed ends of the shank and jewel point member, it is to be understood that said web may be omitted and the shank and jewel member abutted.

In Figs. 6 and 7 are illustrated structures similar to those shown in Figs. 2 and 5 but in which the webs 12 of Figs. 2 and 28 of Fig. 5 are omitted. In other words, the coupling 7' shown in Fig. 6 has a suitable opening extending throughout the length of it and the opposed ends of the shank 6 and the jewel point 9 abut each other, the shank and jewel point being retained in the coupling 7' by suitable cement 17.

In the modification shown in Fig. 7, the coupling 25' is of celluloid similar to the coupling 25 shown in Fig. 5 but the hole extends throughout the length of the coupling and within it are secured the shank 22 and the hard point 23 by means of the application to the interior of the opening of a solvent of celluloid which causes the adjacent portion of the coupling 25' to swell and grip the shank and hard point firmly within the same, the adjacent ends of the shank and stylus point abutting against each other. In other respects the structure is similar to that shown in Fig. 5.

It may be observed that a stylus structure as herein contemplated is advantageous, in that the yielding connection between the shank and its point member comprises a comparatively small portion of the length of the stylus, whereby the tone producing qualities of the steel stylus may be combined with the means for providing a region of relative resiliency for refining the tones produced thereby. Furthermore, the resiliency of said shank and its point member may be varied either by varying the thickness of the web of the coupling interposed between the opposed ends of the shank and the point member, or by varying the diameter of said coupling without varying the diameters of the shank or point member.

It has been common practice to vary the tone of reproducing styli by varying the diameters of their respective shanks. Thus, it will be readily seen that it is only the styli having shanks of the larger diameter that actually fit the socket in the stylus bar or holder. In styli constructed in accordance with this invention, however, the respective shanks of different tones styli may be of a uniform standard diameter, substantially equal to the diameter of the socket in the stylus bar or holder of a sound reproducer, and, therefore, may be readily fitted in said socket and rigidly secured to said bar or holder in any suitable manner.

It is well known that wherein styli having points which may be readily worn by their contact with a sound record disk are employed, it is necessary to replace a stylus after the reproduction of each sound record, in order to prevent injury to the records, caused by the cutting action of the sharp edges of the worn stylus point on the angular corners of the undulatory walls of the groove.

By the employment of such a stylus as herein contemplated, it will be obvious that the inconvenience of replacing a new stylus after the reproduction of each record will be obviated; and that by reason of the fact that the point is not substantially worn by its contact with the record, the reproduction throughout will be of a uniform quality.

In reproducing recorded sound waves, much depends in the quality of the reproduction upon the rigidity of the connected parts, especially the stylus, which necessarily vibrates many times per second, the frequency, of course, depending upon the tones to be produced, and, therefore, it is essential that the coupling be formed of such a material as may be coalesced with the shank and point member to provide a connection that will tightly hold the opposed ends of said members together with such tenacity as to form an integral stylus structure.

It is not desired to limit this invention to the precise details of construction and arrangement herein set forth, as various modifications may be made therein without departing from the essential features of the invention as defined in the appended claims.

Having thus described our invention, we claim:

1. A stylus comprising a shank, a record engaging member, and a coupling more flexible than said shank into which the adjacent ends of said shank and member are inserted and by which they are united, said adjacent ends of said shank and member being spaced from each other longitudinally whereby a transverse section of said stylus between said shank and said member will pass through said coupling only.

2. A stylus comprising a relatively stiff metal shank substantially cylindrical in cross-section, a stylus point substantially cylindrical in cross-section and a non-metallic coupling having substantially cylindrical sockets into which the adjacent ends of said shank and said stylus point are permanently secured, said coupling being more flexible transversely than said shank.

3. In a stylus the combination of a steel shank, a wear-resisting record-engaging tip and a coupling permanently securing said shank and tip together, said shank and said top being spaced apart from each other and said coupling being of non-metallic material whereby said shank and said tip are substantially sound-insulated from each other.

4. A stylus comprising a shank formed of steel, a jewel point, and a coupling formed of bakelite for joining said shank and point together, and having suitable sockets therefor in which they are retained by a suitable adhesive cement.

5. A stylus comprising a shank formed of steel, a jewel point, and a coupling formed of bakelite for joining said shank and point together, and having suitable sockets therefor in which they are retained by bakelite adhesive cement.

6. A stylus comprising a shank formed of steel and having a portion flattened longitudinally, a jewel point having a portion flattened longitudinally, a coupling formed of bakelite and having sockets for said shank and jewel, separated by a web forming a cushion interposed between the opposed ends of said shank and jewel, and cement in said sockets for retaining said shank and jewel therein, said flattened portions affording means of escape for the surplus cement when said shank and jewel are inserted in said sockets.

7. A stylus comprising a coupling formed of bakelite, having alined sockets separated by a web of predetermined thickness, a jewel point snugly fitted in one of said sockets and engaged therein by a suitable adhesive cement, and a shank snugly fitted in the other of said sockets and engaged therein by an adhesive cement, the opposed ends of said shank and jewel being in abutted relation with said web.

8. A stylus comprising a coupling formed of bakelite having alined sockets, a jewel point having a flattened side snugly fitted in one of said sockets and retained therein by adhesive bakelite cement, and a shank having a flattened side and formed of steel snugly fitted in the other of said sockets and retained therein by adhesive bakelite cement, the said flattened sides affording channels for the escape of the surplus cement.

9. A stylus comprising a relatively stiff metal shank, a record engaging point member and a non-metallic coupling, said coupling being provided with sockets into which the ends of said record engaging member and shank are tightly fitted, said sockets being of substantially the same shape in transverse cross-section as the shape of said shank and said record engaging member are in transverse cross-section respectively, and said coupling being more flexible than said shank or record engaging member.

10. A stylus comprising a relatively stiff metallic shank, a record engaging point member in axial alinement therewith, and a non-metallic coupling more flexible than said shank into which the adjacent ends of said shank and record engaging member are permanently and rigidly inserted and by which they are united, said adjacent ends of said shank and record engaging member being spaced from each other longitudinally whereby a transverse section of said stylus between the adjacent ends of said shank and record engaging member will pass through said relatively flexible coupling only.

In witness whereof, we hereunto set our hands this 19th day of July, A. D., 1912.

JAMES W. OWEN.
ALBERTIS HEWITT.

Witnesses:
FRANK B. MIDDLETON, Jr.,
JOHN D. MYERS.

It is hereby certified that in Letters Patent No. 1,235,154, granted July 31, 1917, upon the application of James W. Owen, of Lansdowne, Pennsylvania, and Albertis Hewitt, of Camden, New Jersey, for an improvement in "Styli," errors appear in the printed specification requiring correction as follows: Page 2, line 1, for the word "backing" read *baking;* same page, line 76, for the word "joint" read *point;* page 3, line 72, for the word "tones" read *toned;* page 4, line 11, claim 3, for the word "top" read *tip;* same page and claim, line 14, for the broken word read *from;* same page, line 75, claim 10, strike out the word "point"; and that the said Letters Patent should be read with these corrections therein that the same may conform to the record of the case in the Patent Office.

Signed and sealed this 25th day of September, A. D., 1917.

[SEAL.]

F. W. H. CLAY,
*Acting Commissioner of Patents.*

Cl. 274—38.